United States Patent
Morgan

(10) Patent No.: US 10,564,021 B1
(45) Date of Patent: Feb. 18, 2020

(54) PITCHER AND MIXING RULER FOR PREPARING AND DISPENSING BEVERAGES

(71) Applicant: Lee T. Morgan, New York, NY (US)

(72) Inventor: Lee T. Morgan, New York, NY (US)

(*) Notice: Subject to any disclaimer, the term of this patent is extended or adjusted under 35 U.S.C. 154(b) by 131 days.

(21) Appl. No.: 15/700,097

(22) Filed: Sep. 9, 2017

Related U.S. Application Data

(62) Division of application No. 14/545,884, filed on Jul. 1, 2015, now Pat. No. 9,759,595.

(51) Int. Cl.
| | |
|---|---|
| A47J 43/27 | (2006.01) |
| A47G 19/12 | (2006.01) |
| G01F 19/00 | (2006.01) |
| A47G 21/00 | (2006.01) |

(52) U.S. Cl.
CPC .............. *G01F 19/00* (2013.01); *A47G 19/12* (2013.01); *A47G 21/00* (2013.01); *A47J 43/27* (2013.01); *A47J 2203/00* (2013.01)

(58) Field of Classification Search
CPC ......... G01F 19/00; A47G 21/00; A47G 19/12; A47J 43/27; A47J 2203/00
See application file for complete search history.

(56) References Cited

U.S. PATENT DOCUMENTS

| | | | |
|---|---|---|---|
| 1,664,266 A | | 3/1928 | Del Rio |
| 2,010,534 A | * | 8/1935 | Collins ................... A47J 43/27 220/568 |
| 2,013,615 A | * | 9/1935 | Fontan .................... A47J 43/27 220/23.87 |
| 2,027,494 A | * | 1/1936 | Trabold .................. G01F 19/00 33/486 |
| 2,208,431 A | * | 7/1940 | Rochow .................. A47J 43/27 220/669 |
| 2,771,913 A | | 11/1956 | Flasnocker |
| 3,185,189 A | | 5/1965 | Reid |
| 4,050,484 A | | 9/1977 | Danyo |
| 4,293,008 A | | 10/1981 | Coleman |
| 4,762,251 A | | 8/1988 | Berger |
| 5,163,488 A | | 11/1992 | Basch |
| 7,013,933 B2 | | 3/2006 | Sher |
| 7,437,990 B2 | | 10/2008 | Duch |
| 7,997,305 B2 | | 8/2011 | Haramis |

(Continued)

*Primary Examiner* — Nicolas A Arnett
(74) *Attorney, Agent, or Firm* — Price & Adams, P.C.

(57) ABSTRACT

A ruler for mixing the ingredients of a selected beverage is slidably received in a vertical slot formed on the inside wall of a pitcher. The beverage ingredients for mixing are listed on each side of the ruler. The list of ingredients for each beverage is color coded to distinguish one beverage from another. The amount and order for mixing the ingredients in the pitcher are identified by parallel spaced measuring lines extending from the bottom to the top of the ruler. The lowermost measuring line on the ruler identifies the first ingredient added to the pitcher. The remaining ingredients are sequentially added to the pitcher to the level of the measuring line identifying each ingredient. The ingredients for mixing are added to the pitcher without requiring the volume of each ingredient to be separately measured and added. With the mixing ruler being releasably attached to the pitcher a set of mixing rulers for a collection of beverage recipes is available for use in mixing beverages in the pitcher.

11 Claims, 11 Drawing Sheets

(56) References Cited

U.S. PATENT DOCUMENTS

| | | | |
|---|---|---|---|
| 8,256,130 B2* | 9/2012 | Jantz | A23L 5/11 |
| | | | 116/227 |
| 8,726,948 B2 | 5/2014 | Haramis | |
| RE45,935 E | 3/2016 | Taufer | |
| 9,403,624 B2 | 8/2016 | Traboulsi | |
| 9,759,595 B1* | 9/2017 | Morgan | G01F 19/00 |
| 2011/0042255 A1 | 2/2011 | Traboulsi | |
| 2015/0216361 A1* | 8/2015 | Tsui | A47J 43/27 |
| | | | 366/130 |

* cited by examiner

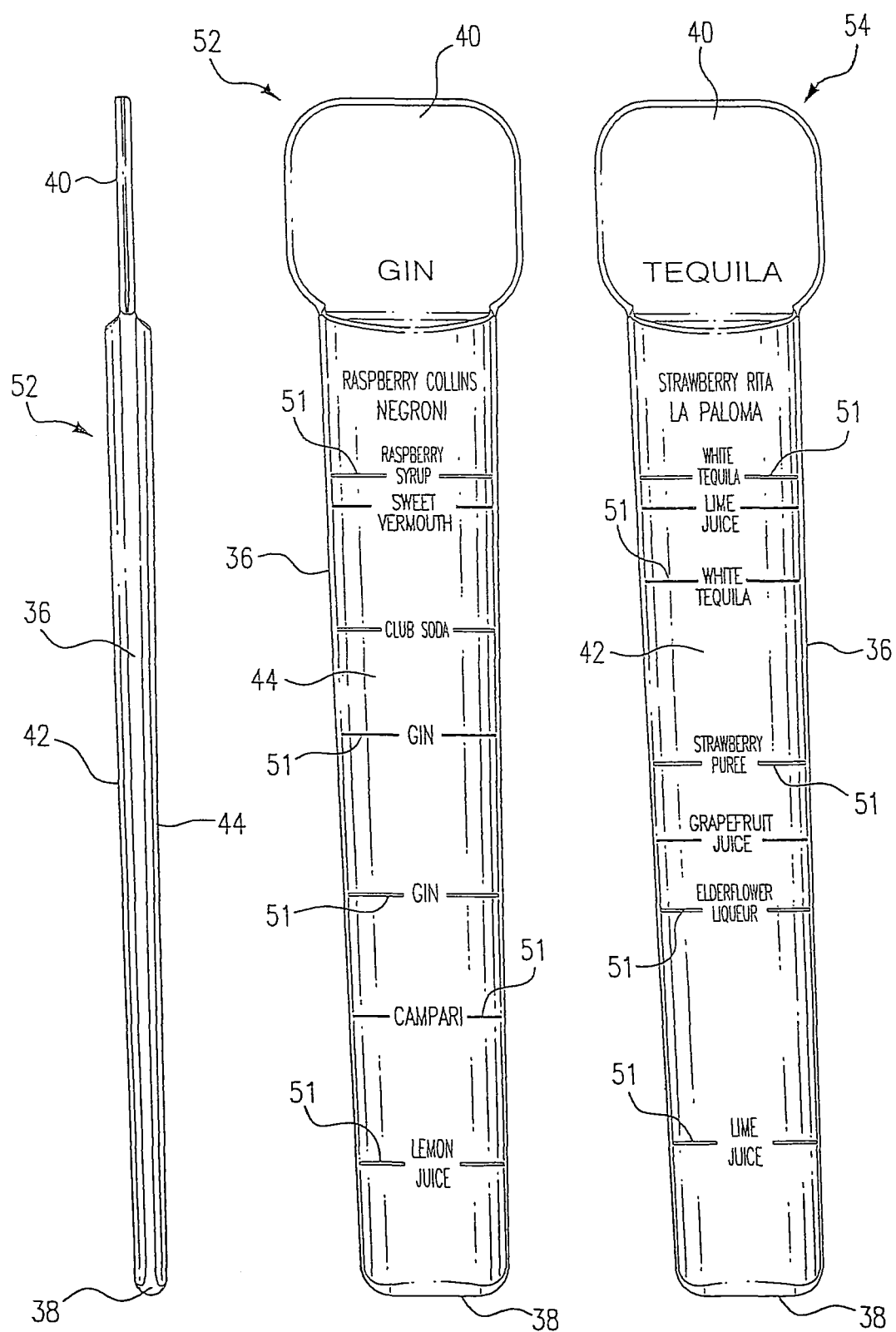

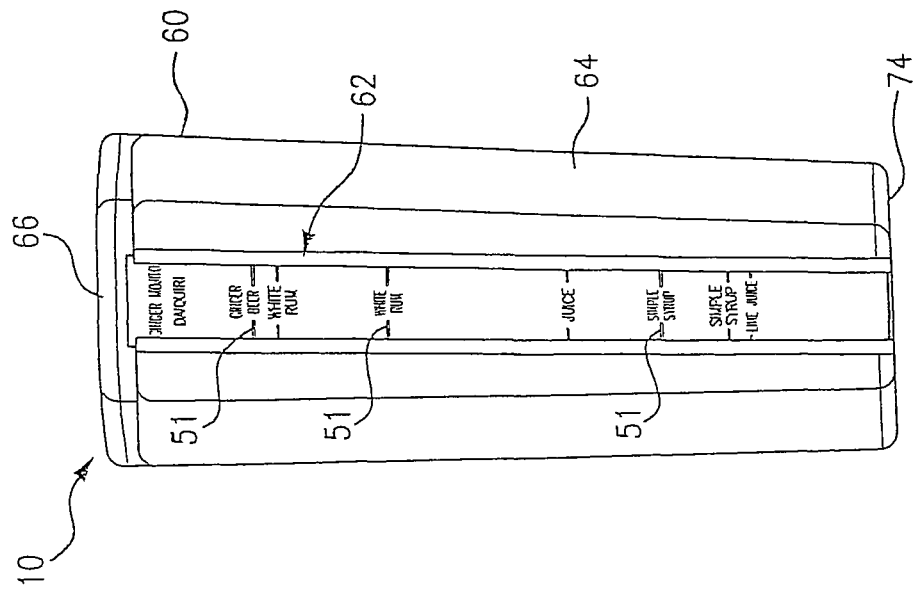
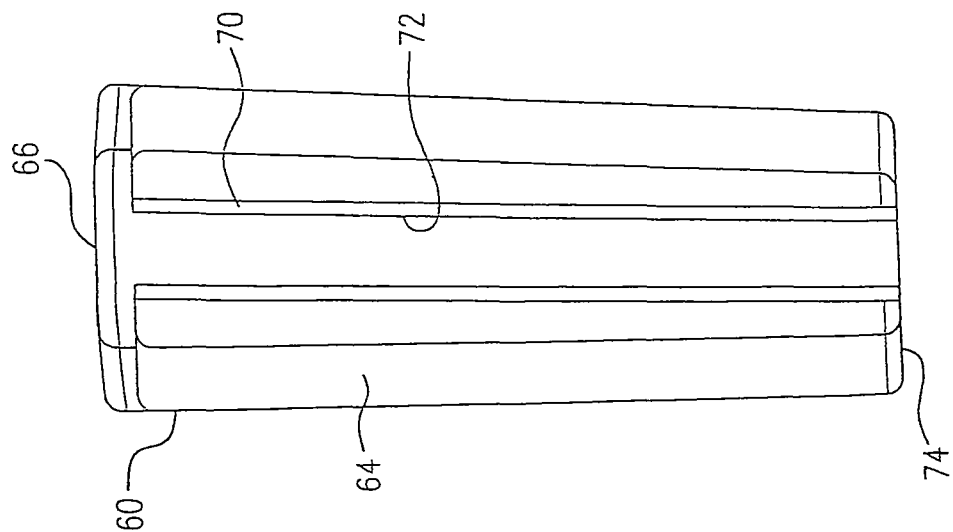
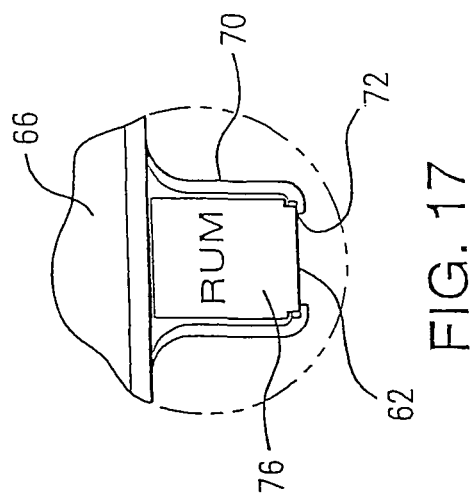

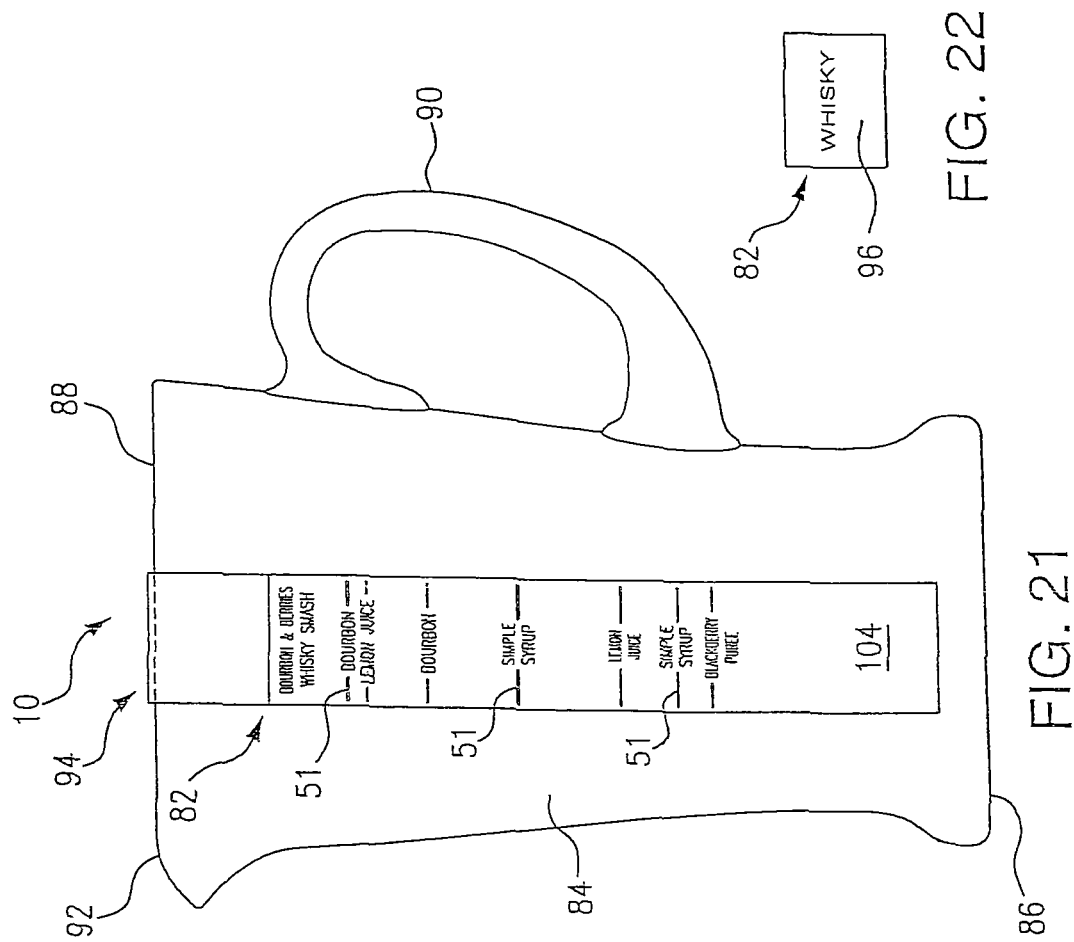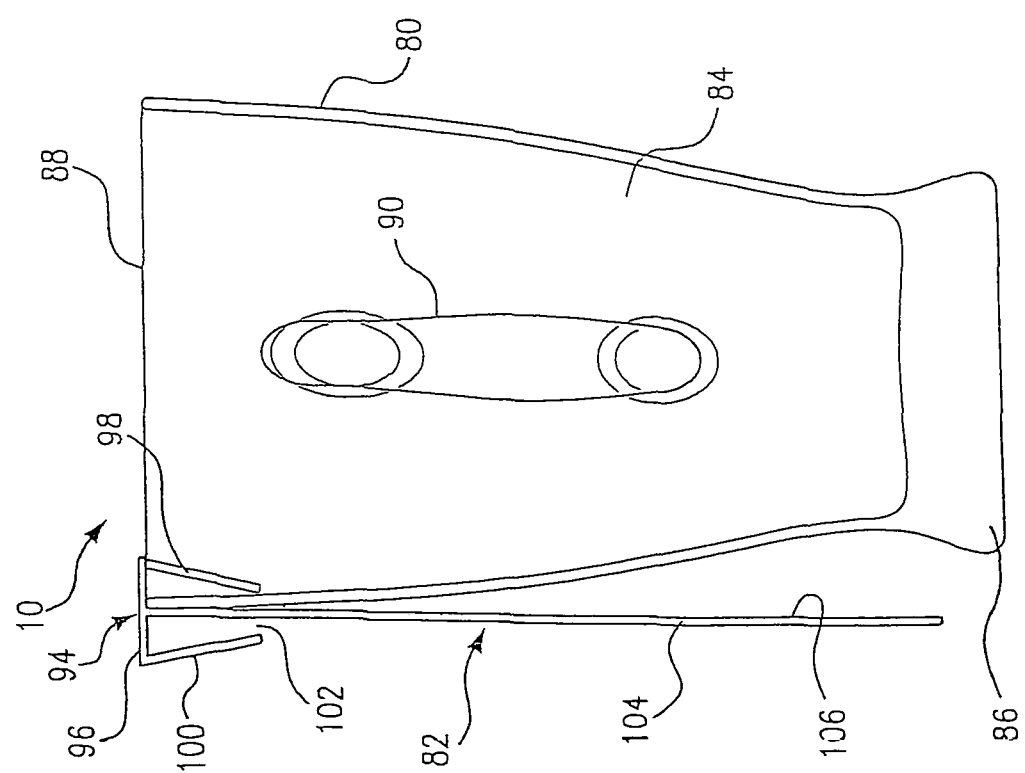

PITCHER AND MIXING RULER FOR PREPARING AND DISPENSING BEVERAGES

CROSS-REFERENCE TO RELATED APPLICATION

This application is a division of U.S. application Ser. No. 14/545,884 filed Jul. 1, 2015.

BACKGROUND OF THE INVENTION

1. Field of the Invention

The present invention relates to method and apparatus for preparing and dispensing beverages from a pitcher and, more particularly, a pitcher for receiving the ingredients for mixing both alcoholic and non-alcoholic beverages where the ingredients for the beverage to be mixed and the amount of each ingredient are identified by a measuring ruler releasably attached to the pitcher where a plurality of measuring rulers are provided for mixing the ingredients of any number of beverages.

2. Description of the Prior Art

It is a well known practice in the use of a mixing cup for cooking to identify on the cup the levels at which ingredients are added to the cup. For example, the exterior of a mixing cup is marked to identify the levels for filling ingredients from one-fourth cup to a full cup. Measure lines extend from the bottom of the cup to the open upper end of the cup. A one-half cup of sugar is measured by adding sugar to the cup to the measuring line that is identified as one-half cup.

On another portion of the circumference of the measuring cup, measuring lines identify increments in ounces from the bottom level of the cup at two ounces to the top level at eight ounces. The measuring marks are imprinted on the surface of the cup and are visible from the outside of the cup. The information that can be printed on the cup is limited by the circumferential surface area of the cup.

In the mixing of beverages that include a number of different ingredients, such as an alcoholic beverage, it is well known to use cocktail shakers for mixing ingredients in the required amounts. In one embodiment the circumference of the cocktail shaker is marked with the names of a number of cocktails to be mixed followed by a list of the ingredients. For example, the cocktail shaker identifies the ingredients of a margarita to include 4 oz. of tequila, 2 oz. of Cointreau and 1 oz. of lemon juice. The same approach is used to identify other cocktails, such as a Manhattan, daiquiri, martini, bloody Mary, and the like.

The ingredients by volume of each cocktail appears on one portion of the circumferential surface of the cocktail shaker. Another portion of the circumference of the cocktail shaker is imprinted with measure lines for identifying volume in ounces beginning at the bottom with one ounce and progressing vertically to the top of the cocktail shaker to, for example, 15 oz. A measure line is provided for each ounce from one to fifteen ounces. Using the shaker to mix a margarita, you would add tequila in the amount of 0.4 oz. to a level opposite the 4 oz. mark. From the 4 oz. mark, 2 oz. of Cointreau would be added to the 6 oz. mark and then 1 oz. of lemon juice would be added to the 7 oz. mark for a margarita containing 7 oz. of ingredients.

There are a number of disadvantages with the above-described cocktail shaker. Principally, the number of different beverages identified on the shaker for mixing is limited by the circumferential surface area available for identifying the ingredients for each cocktail. Typically, the ingredients for no more than six different beverage would be listed around the circumference of the shaker, leaving room to print the measuring scale. With this arrangement one scale in ounces is provided on the cocktail shaker for mixing the ingredients of each beverage.

Each cocktail has different ingredients added at different volumes to the shaker. Therefore, a single scale must be provided identifying increments of ounces from one ounce to an upper limit, for example eight or ten ounces. Furthermore, each ingredient is added one by one to the shaker by an ounce container (shot glass) by the volume required for the cocktail. For example, after 4 oz. of tequila are added to the shaker, 2 oz. of Cointreau are added to the measuring line identifying 6 oz. Again, this requires adding the required volume beginning with the volume of the last ingredient added to the vessel. This makes it difficult to precisely measure the ingredients that are to be mixed together.

There is need for a beverage mixing device that can be used to identify the ingredients of any number of beverages where the user knows exactly to what level in the mixing device the selected ingredients are added.

SUMMARY OF THE INVENTION

In accordance with the present invention there is provided apparatus for mixing and preparing beverages that includes a handheld vessel having a closed lower end portion and an open upper end portion for receiving liquid ingredients. The vessel has an outer surface and an inner surface defined by a wall of the vessel. The wall extends between the lower end portion and the upper end portion of the vessel. An ingredient mixing guide is detachably mounted on the vessel. The mixing guide identifies the ingredients of a selected beverage for mixing in the vessel. The mixing guide is mounted on the vessel to extend between the lower end portion and the upper end portion. A plurality of measure lines are displayed on the mixing guide in spaced parallel relation along the length of the guide between the lower end portion and the upper end portion of the vessel. The measure lines each identify a selected ingredient for sequentially adding to the vessel in an amount that fills the vessel to the measure line identifying the ingredient. The mixing guide is detached from the vessel after all the ingredients identified on the mixing guide have been added to the vessel.

Further in accordance with the present invention there is provided a method for mixing beverages in a vessel that includes the steps of identifying on a measuring guide the ingredients of a selected beverage for mixing in an open-ended vessel. Spaced apart marks are positioned the length of the stirring device corresponding to the beverage ingredients. The stirring device is releasably attached to extend upright on the vessel. The vessel is filled with one ingredient after another beginning with the first ingredient added to the bottom of the vessel p to the mark identifying the first ingredient. Thereafter, the remaining ingredients are added one after another to a level in the vessel opposite the respective identifying mark for the ingredient until all of the ingredients are added to the vessel.

Further the present invention is directed to a kit for mixing ingredients of a selected beverage in a vessel that includes a closed lower end and an open upper end for containing a liquid beverage. A measuring ruler has a length extending between the closed lower end and the open upper end of the vessel. The measuring ruler identifies the ingredients of a selected beverage for mixing in the vessel. The measuring ruler has spaced apart measuring lines identifying the ingredients for the beverage. The ruler is releasably attached to the vessel to display the ingredients identified on the measuring ruler to permit the ingredients to be added one after another to the vessel to a level opposite the measuring line for each ingredient.

Further in accordance with the present invention there is provided a tool for mixing ingredients of a beverage that includes an elongated member for stirring liquid contents added to a container for mixing a selected beverage. The elongated member has a length substantially greater than the width thereof. A plurality of measure lines are positioned on the elongated member in spaced relationship the length of said elongated member. The measure lines each identify a selected ingredient for adding sequentially to the container. The measure lines are spaced a distance apart in proportion to the volume of each ingredient added to the container for mixing.

A principal object of the present invention is to provide an apparatus for mixing a selected one of a number of beverages by easily identifying to the user the amount of each ingredient to be mixed for the selected beverage on the apparatus.

Another object of the present invention is to provide a container for mixing the ingredients of a wide variety of beverages by identifying on the surface of the container the ingredients that are added to the container for mixing a selected beverage.

Another object of the present invention is to provide a collection of measuring devices each identifying the ingredients of a selected beverage to be mixed in a pitcher where each measuring device is detachably mounted on the vessel to identify the level to which each ingredient is added to the pitcher for precisely mixing the ingredients.

These and other objects of the present invention will be more completely disclosed and described in the following specification, the accompanying drawings, and the appended claims.

BRIEF DESCRIPTION OF THE DRAWINGS

FIG. 7 is an end view of a mixing ruler.

FIG. 8 is a view in side elevation of one side of the mixing ruler shown in FIG. 7, illustrating the ingredients for mixing two types of a gin based cocktails in the pitcher.

FIG. 9 is a view in side elevation of a mixing ruler, illustrating the ingredients for mixing two types of tequila based beverages in the pitcher.

FIG. 17 is an enlarged fragmentary view of the handle portion of the pitcher shown in FIGS. 15 and 16, illustrating the snap-on connection of the mixing ruler to the handle where the top surface of the mixing ruler identifies the type of beverage to be mixed.

FIG. 18 is an end view of the pitcher shown in FIG. 15, illustrating the slot formed in the handle for the snap-on connection of the mixing ruler.

FIG. 19 is an end view of the pitcher shown in FIG. 15, illustrating the mixing ruler snapped in place on the pitcher handle.

FIG. 20 is an end view of another embodiment of the combination pitcher and mixing ruler, illustrating the mixing ruler releasably attached to the rim of the pitcher.

FIG. 21 is a view in side elevation of the combination pitcher and mixing ruler shown in FIG. 20, identifying the beverage ingredients on the mixing ruler for preparing two types of whiskey-based beverages.

FIG. 22 is a top plan view of the mixing ruler shown in FIGS. 20 and 21, identifying that the mixing ruler is used to mix a whiskey-based beverage.

DESCRIPTION OF THE PREFERRED EMBODIMENTS

Figure 1:
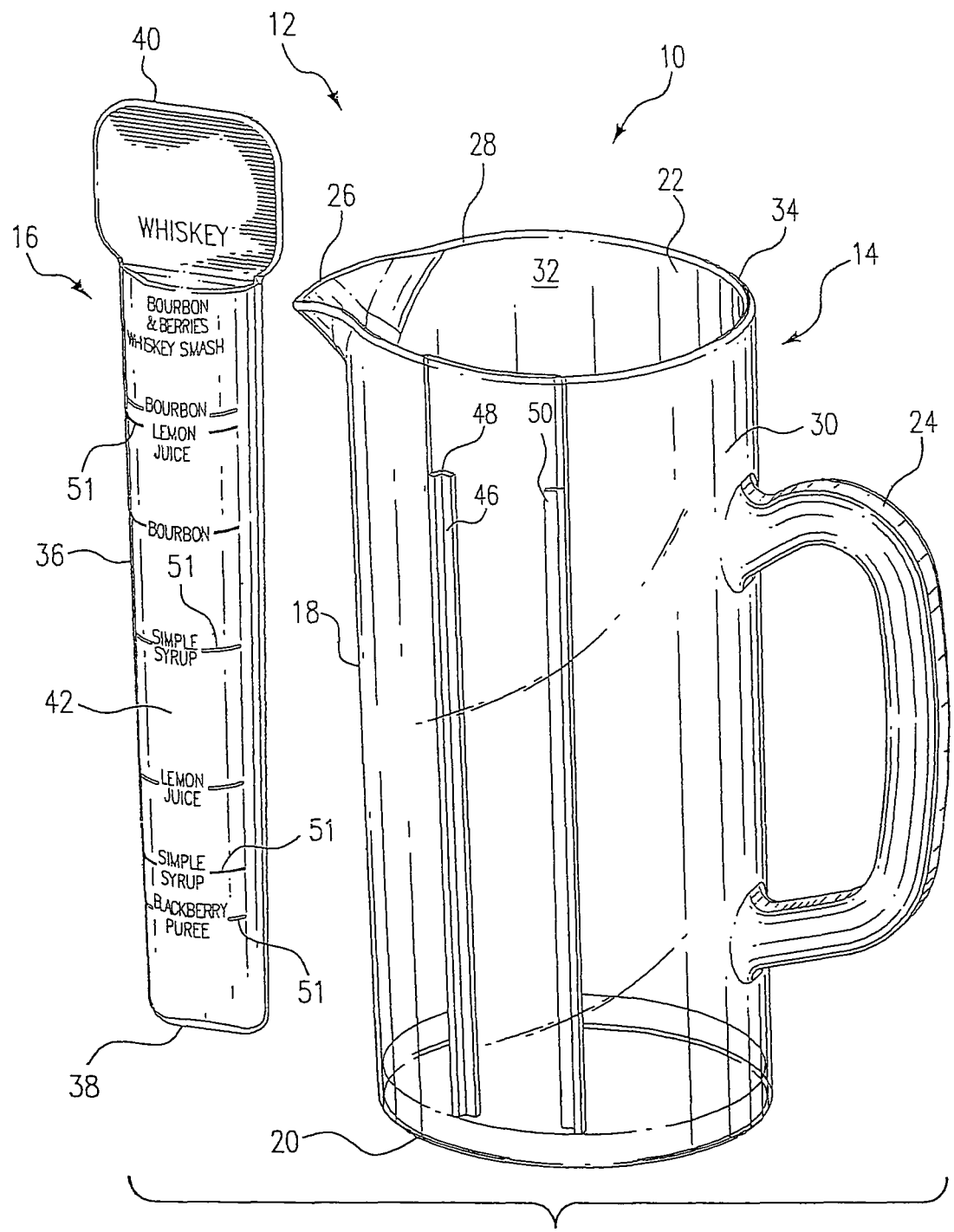
FIG. 1 is an exploded isometric view of a combination pitcher and a mixing ruler.

Referring to the drawings and particularly to FIGS. 1-6, there is illustrated apparatus generally designated by the numeral 10 for mixing and preparing beverages formed by a plurality of ingredients. Example beverages are alcoholic and non-alcoholic beverages. The apparatus 10 is embodied by a kit 12 including a vessel 14, such as a pitcher, for receiving and mixing selected ingredients of a beverage and a mixing ruler 16. The mixing ruler 16 functions as a measuring guide and a stirring device, as explained below in greater detail. The vessel 14 preferably includes a generally cylindrical body 18 having a closed end portion 20 and an open end portion 22. Extending from the cylindrical body 18 is a handle 24 for gripping to maneuver the vessel, particularly in pouring the mixed ingredients forming the beverage from the vessel 14. A pour spout 26 is formed on an upper edge or rim 28 positioned opposite the handle 24. The vessel 14 includes an outer cylindrical surface 30 and an inner cylindrical surface 32 forming a wall 34 of a preselected thickness therebetween.

Preferably, the vessel 14 is in the shape of a conventional pitcher having a preselected length and volume to efficiently receive the ingredients for mixing in the vessel 14. It should be understood that the vessel 14 is not confined to the configuration of a conventional pitcher. It may take any preselected configuration dictated by its use either for individual use or commercial use in preparing mixed beverages. One example configuration is a cocktail shaker having no handle.

The pitcher 14 is fabricated of any suitable non-toxic material for mixing ingredients for human consumption. The preferred materials for fabricating the pitcher 14 are plastic, glass, and any other transparent material. In one embodiment the pitcher 14 shown in FIGS. 1-6 is fabricated by injection molding of plastic to provide a light weight, durable structure.

The pitcher 14 and mixing ruler 16 form the kit 12 by which a beverage formed of selected ingredients is mixed in the pitcher 14. The mixing ruler 16 is also preferably fabricated of plastic material and includes an elongated body portion 36 having a lower end portion 38 and an enlarged or expanded upper end portion 40. The body portion 36 has opposite planar surfaces 42 and 44 that extend a preselected length from the lower end portion 38 to the upper end portion 40. A profile of the stirring device is shown in FIG. 7.

As will be explained later in greater detail, the planar surfaces 42 and 44 are inscribed with the names of the ingredients that are added to the pitcher 14 for mixing the desired beverage, such as a cocktail, either alcoholic or non-alcoholic. As shown in FIG. 7, the width of the mixing ruler is sufficient for containing the identification of the beverage ingredients. Because the body portion 36 of the mixing ruler 16 is relatively thin it takes on the configuration of a stirring device, or cocktail stick. The opposite planar surfaces 42 and 44 are imprinted/inscribed with the names of the ingredients for a number of beverages that are mixed in the pitcher using the mixing ruler 16. The names are color coded to distinguish the ingredients of one beverage from the other.

The mixing ruler 16 is detachably mounted on the pitcher 14 to fix the position of the mixing ruler. 16 on the pitcher 14 when in use and to remove the mixing ruler 16 from attachment to the pitcher 14.

Figure 3:
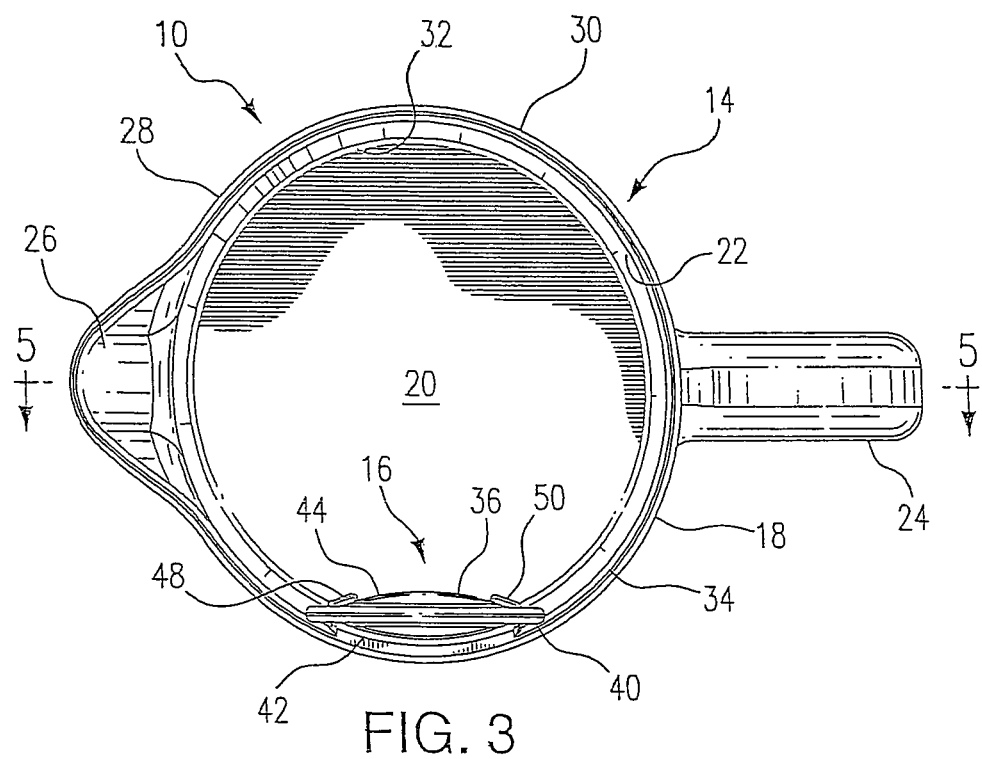
FIG. 3 is a top plan view of the pitcher shown in FIG. 1, illustrating the mixing ruler releasably mounted on the interior wall of the pitcher.
Figure 4:
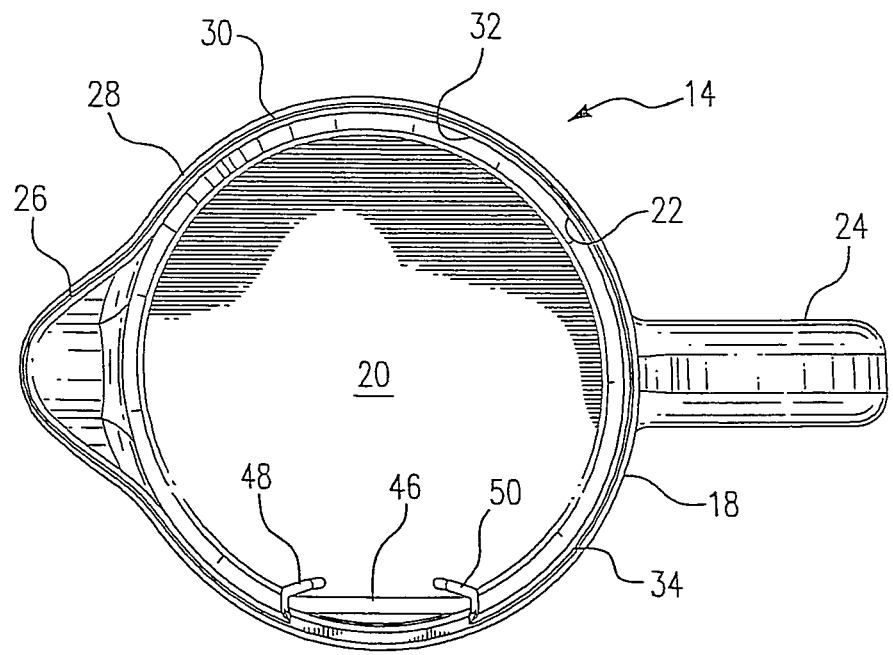
FIG. 4 is a top plan view of the pitcher shown in FIG. 1, illustrating the mixing ruler removed from attachment to the interior wall of the pitcher.
Figure 5:
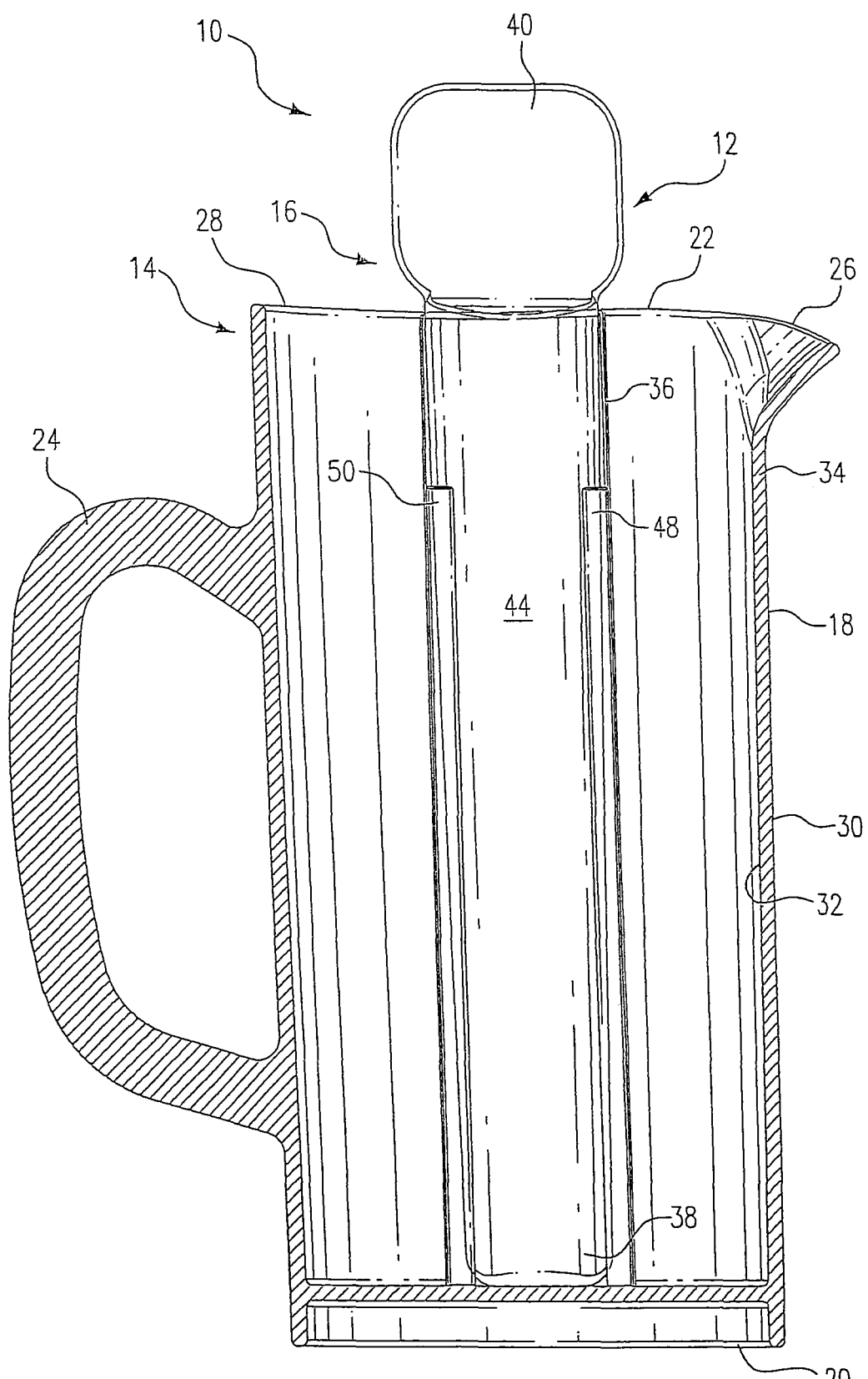
FIG. 5 is a sectional view in side elevation of the pitcher taken along line 5-5 in FIG. 3, illustrating a slot formed on the interior wall of the pitcher for slidably reaching the mixing ruler thereon.

To facilitate the releasable attachment of the mixing ruler 16 to the pitcher 14, the pitcher is provided with an elongated slot or groove generally designated by the numeral 46, as illustrated in detail in FIGS. 1, 3, and 4. Preferably, the slot or groove 46 is formed integral with the pitcher body portion 18 in the injection molding process. The slot 46 is formed by guide rails 48 and 50. The guide rails 48 and 50 extend from the closed end portion 20 of the pitcher 14 vertically on the pitcher inner wall 34 to a point spaced below the pitcher rim 28.

The guide rails 48 and 50 are positioned a preselected distance apart and extend vertically in spaced parallel relation on the pitcher wall 34 to form the slot or groove 46. The guide rails 48 and 50, as seen in FIG. 4, have an arcuate converging configuration that form the longitudinally extending slot 46. The spaced apart rails 48 and 50 form a preselected area on the pitcher wall 34 for slidably receiving the mixing ruler 16. In this manner the mixing ruler 16 is securely positioned on the pitcher body 18.

The slot or groove 42 formed on the inner wall 34 of the pitcher 14 is dimensioned to slidably receive and retain the mixing ruler 16 in a fixed position on the wall 34 of the pitcher 14. Accordingly, the mixing ruler 16 has a thickness, as shown in FIG. 7, corresponding to the width of the elongated slot 46 formed by the guide rails 48 and 50 which easily facilitates slidable movement of the stirring device into and out of the slot 46.

Figure 2:
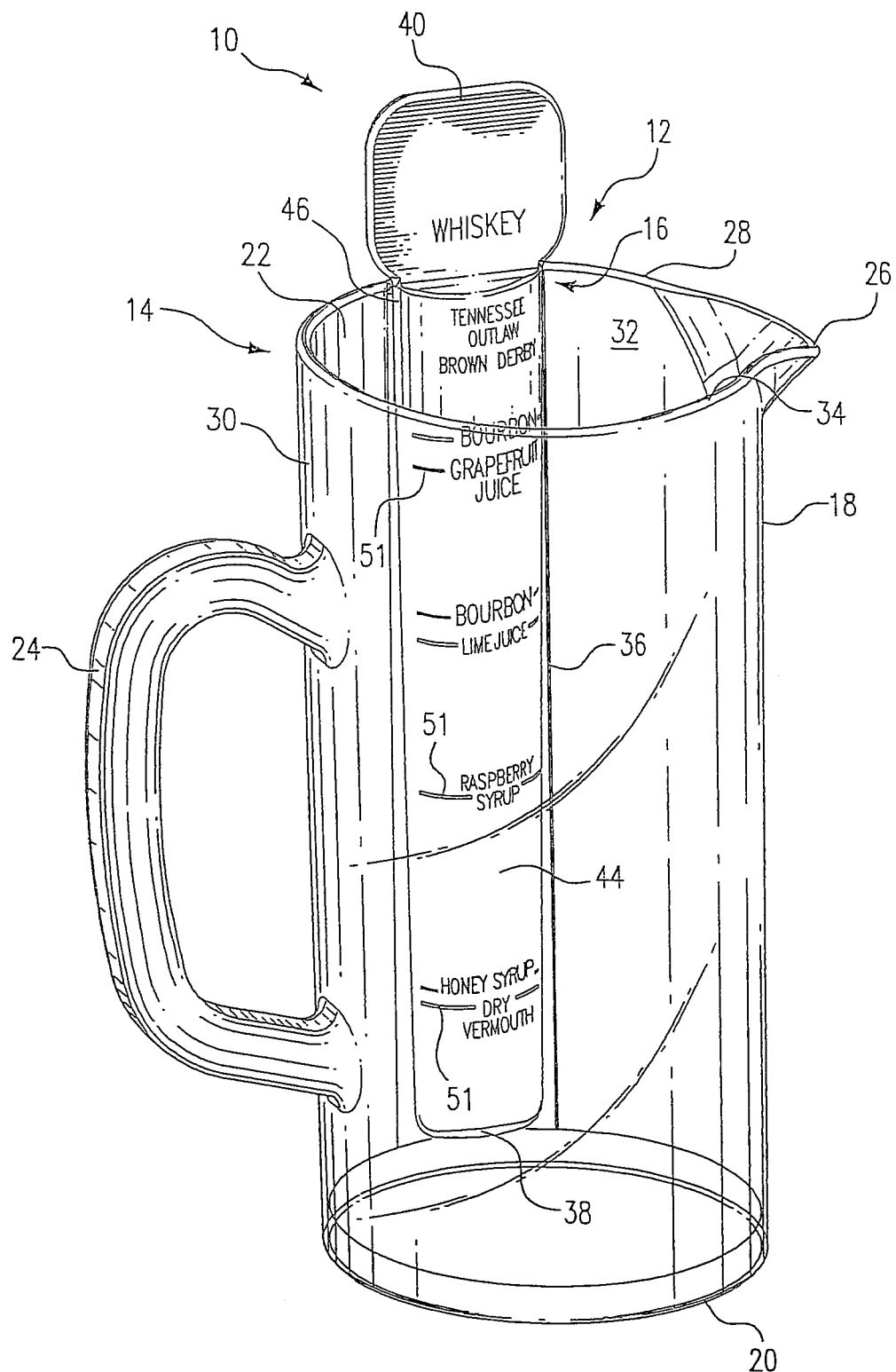
FIG. 2 is an isometric view of the combination pitcher and mixing ruler shown in FIG. 1, illustrating the ruler releasably attached to the interior wall of the pitcher where the ingredients of two types of beverages for mixing in the pitcher are identified on the mixing ruler.

As shown in FIGS. 2-4, the guide rails 48 and 50 forming the slot 46 secure the mixing ruler 16 against the inner wall 34 of the pitcher 14. With the mixing ruler 16 secured to the wall 34 of the pitcher, an identification of the ingredients on the mixing ruler 16 to be added to the pitcher for preparing the selected beverage is clearly visible to the user through the wall of the pitcher. From outside of the pitcher, the user can see the list of the beverage ingredients on the mixing ruler 16 and can observe the level of the ingredients reached on the mixing ruler 16 as the ingredients are added one after another to the pitcher 14. In this manner the mixing ruler 16 functions as a measuring guide listing the beverage ingredients in a vertical array on the ruler. For this reason, the pitcher is fabricated of a transparent material to permit the user to read the identifying information on the mixing ruler 16.

With the provision of the slot 46 for removably attaching the mixing ruler 16 to the pitcher 14, a number of stirring devices or mixing rulers 16 for many different types of beverages for mixing in the pitcher are utilized in accordance with the present invention. This overcomes the disadvantage of conventional beverage mixing containers and cocktail shakers where the ingredients are inscribed or imprinted on the surface of the container. Because there is a limited surface area on which identifying information can be printed, the use of a conventional 'cocktail shaker for' measuring ingredients is not efficient. With the present invention there is no limit to the number of different types of beverages that can be mixed in the pitcher 14 by the provision of releasably attaching the mixing ruler 16 to the pitcher 14. Each mixing ruler identifies the ingredients of a number of beverages in the order and amount to be added sequentially to the pitcher. In one embodiment, each side of the mixing ruler 16 is provided in a color coded manner with the identification of two different types of beverages for mixing. Therefore, as illustrated in FIGS. 1 and 2 a single mixing ruler 16 used with the pitcher 14 identifies the ingredients of four different beverages for mixing in the pitcher 14.

In the example of the mixing ruler illustrated in FIGS. 1 and 2, the mixing ruler 16 is used to prepare four different type of whiskey based alcoholic beverages. This is carried out by using both sides 42 and 44 of the mixing ruler 16 to not only identify the ingredients for a specific drink but the proportions of the ingredients to be added to the pitcher 14. In the example of the mixing ruler 16 illustrated in FIGS. 1 and 2, the ruler 16 is used to prepare a whiskey based cocktail selected from four having different combination of ingredients, as identified on the surfaces 42 and 44 of the mixing ruler 16.

FIG. 1 illustrates the ingredient information for two different cocktails on surface 42 of ruler 16. The enlarged upper end 40 of the ruler 16 includes the identification "WHISKEY" which indicates that this ruler is used to make whiskey based beverages. On the surface 42 shown in FIG. 1, two different types of whiskey based beverages are identified at the top of the ruler. One beverage is identified as "BOURBON & BERRIES" and another is identified as "WHISKEY SMASH". The identification of these two drinks is printed in a color coded manner so that the ingredients for the BOURBON & BERRIES cocktail is distinguished from the ingredients for WHISKEY SMASH.

Preferably, the identification of the cocktails and ingredients are color coded. The ingredients for BOURBON & BERRIES would be colored white and the ingredients for the WHISKEY SMASH would be colored orange. For purposes of illustration in FIG. 1, the ingredients for BOURBON & BERRIES is lighter in print than the ingredients for the WHISKEY SMASH. In this manner, the user identifies what ingredients are added to the pitcher to mix either a Bourbon & Berries cocktail or a WHISKEY SMASH cocktail.

In use, to prepare one of the two whiskey based cocktails identified on the surface 42 of ruler 16, the ruler is inserted in the slot 46 so that the surface 42 is visible from the outside of the pitcher. Consequently, the opposite surface 44 of the ruler 16 is positioned, as shown in FIG. 2, facing inwardly within the pitcher. Again, because the pitcher 14 is transparent the information inscribed on the ruler 16 is visible to the user mixing the ingredients.

The identifying ingredients appearing on all of the mixing rulers used with the present invention correspond to the recipe that is known for mixing the selected beverage. Any manner of imprinting or impressing the wording on the ruler so that it becomes a permanent part of the ruler is used. In one embodiment the printed information is in the form of a die cut strip adhesively attached to the surfaces 42 and 44 of the ruler. The strip identifies each ingredient and the volume by a measuring line 51 to which the ingredient is added to the pitcher. The measuring lines 51 provide the instructions for mixing the selected beverage.

Once the mixing ruler is inserted in the slot 46 within the pitcher 14 where the desired beverage to be mixed is visible from outside the pitcher, then the ingredients are sequentially added to the measuring line 51 of each ingredient. For accurate mixing of the ingredients, the mixing ruler has a length that extends from abutting position of the lower end 38 with the closed end portion 20 of the pitcher 14. Most preferably, the mixing ruler. 16 extends in length where the enlarged end 40 of the mixing ruler appears above the pitcher rim 28.

To prepare one of the two whiskey based cocktails identified on the ruler surface 42, the ruler 16 is positioned in the slot 46 so that the surface 42 is visible from outside the pitcher 14. The identifying ingredients are viewable through the transparent wall 34 of the pitcher. One of the two drinks is selected. For example, if it is desired to mix a "WHISKEY SMASH" the ingredients are added to the beverage up to the measure lines identified for each of the respective ingredients of the cocktail. For example as shown in FIG. 1, the first ingredient added to the pitcher 14 to prepare a WHISKEY SMASH is simple syrup. Simple syrup is added to the mixing line identified for simple syrup. After simple syrup is added, the next ingredient, as identified by the bold print, is bourbon. A volume of bourbon is added to the pitcher 14 to the point where the level of the bourbon in the pitcher 14 is opposite the measuring line identified for "bourbon". Thereafter a quantity of lemon juice is added to the level opposite the mixing line identified for lemon juice.

In accordance with the present invention, each of the ingredients for forming the beverage is identified on the mixing ruler 16, as well as the volume of the ingredient to be added without having to measure the ingredient. Thus, the mixing ruler functions as a guide for mixing the specific beverage. The demarcations or lines 51 on the ruler are spaced apart the required distance for adding the required amount of each ingredient of the selected beverage. All that is required is to sequentially add the ingredients to the pitcher from the lower end 38 of the mixing ruler 16 to the last ingredient listed at the top of the mixing ruler. This provides a fool proof method for mixing the ingredients of a cocktail without having to measure the volume of each ingredient using a measuring device, such as a shot glass, separately from the pitcher. The volume to be added for each ingredient is predetermined by the relative positioning of the measuring lines 51 inscribed on the mixing ruler 16.

Once all the ingredients have been added to the pitcher to the levels required, the mixing ruler 16 is removed from the slot 46 and then used to stir the ingredients. After the ingredients are adequately mixed, the ruler is removed from the pitcher. The mixed contents are then poured from the pour spout 26.

The length of the mixing ruler 16 and the spacing between the measuring lines 51 identifying the ingredients on the ruler for mixing the desired beverage is determined by the size of the pitcher so that at least all of the desired contents can be added to the pitcher in the correct proportion. The correct proportion according to the accepted recipe for mixing the beverage is predetermined by the length of the mixing ruler and the size of the pitcher. The spacing of the measuring lines 51 for adding each ingredient is determined by the recipe for the beverage.

Referring to FIGS. 1 and 2, in the preparation of a WHISKEY SMASH cocktail, simple syrup is added from the bottom of the pitcher up to the measuring line for simple syrup. Then the quantity of bourbon to be added is determined by the volume that fills the pitcher to the measuring line identified for bourbon. Lemon juice is added in the amount that fills the pitcher from the bourbon measuring line to the lemon juice measuring line.

In the mixing of a BOURBON & BERRIES cocktail, the first ingredient added to the pitcher is blackberry puree filled to the measuring line therefor. Thereafter, lemon juice is added to the level of the measuring line that appears on the ruler. It is clearly seen through the wall 34 of the pitcher when the amount of lemon juice added to the pitcher reaches the measuring line for lemon juice. Thereafter, simple syrup is added to the level of the measuring line followed by the addition of bourbon to the level of the measuring line. After all of the ingredients are added to the pitcher, the mixing stirrer 16 is removed from the slot 46 and used to thoroughly mix the contents before pouring from the pitcher 14.

To mix one of the whiskey cocktails identified on the surface 44 of the mixing ruler 16, as shown in FIG. 2, the position of the ruler 16 on the pitcher is reversed so that the ingredients for a "TEXAS OUTLAW" and a "BROWN DERBY" cocktail are visible from the outside of the pitcher 14. The beverages illustrated on the surface 44 of the mixing ruler 16 are also color coded so that each ingredient for a beverage is distinguishable from the ingredients of the other beverage. This permits the ingredients of multiple beverages to be identified on opposite sides of the mixing ruler.

In accordance with the present invention, a single mixing ruler is used to identify and mix four different types of cocktails. With the mixing ruler 16 shown in FIG. 2, for a BROWN DERBY whiskey cocktail, the ingredients of honey syrup, bourbon, and grapefruit juice are sequentially added one after the other to the respective measuring lines for each ingredient until all of the ingredients have been added to the vessel. Thereafter, the mixing ruler 16 is removed from the slot 46 and used to stir the contents in the pitcher 14.

Figure 6:
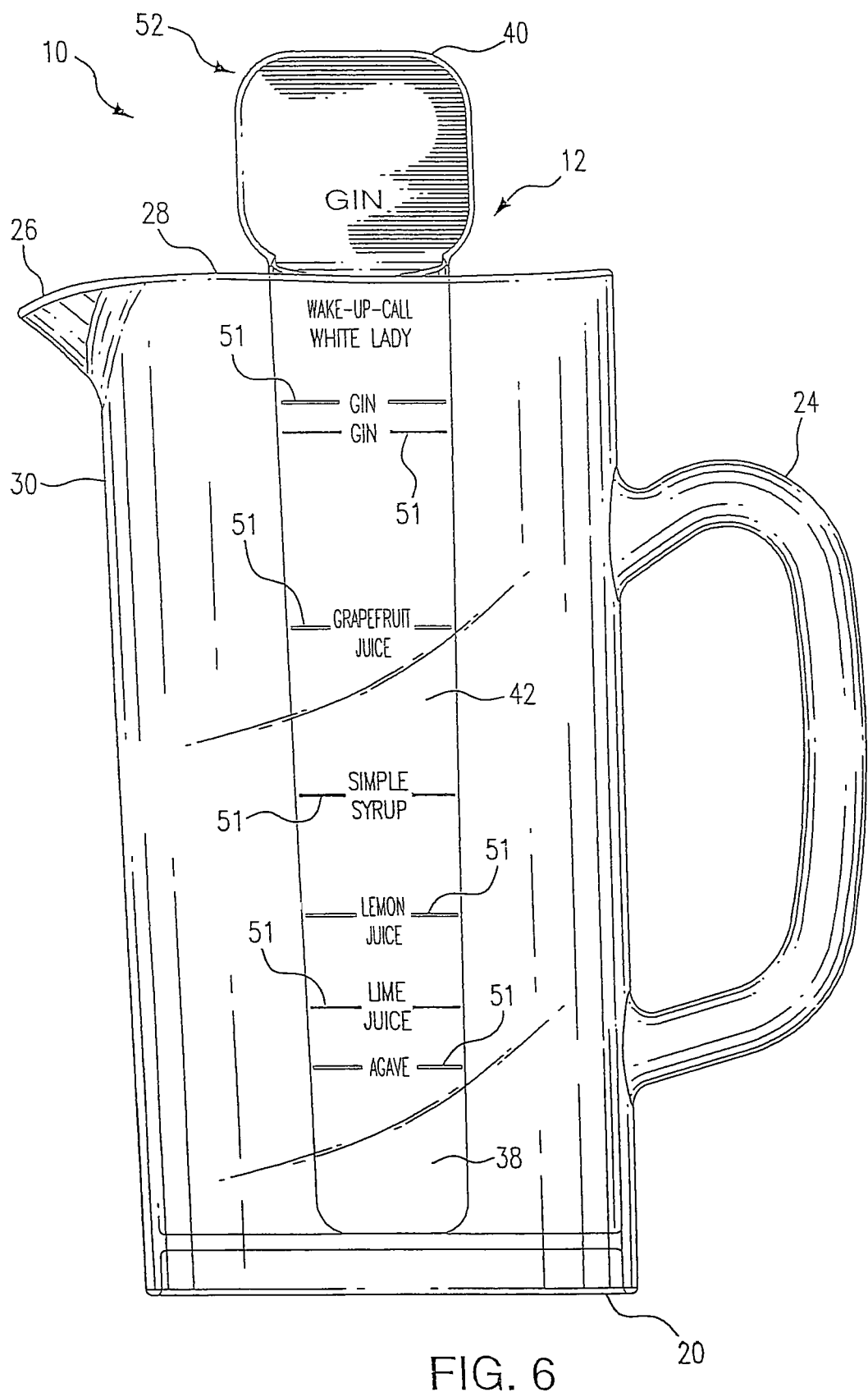
FIG. 6 is a view in side elevation of the pitcher, illustrating the mixing ruler positioned in the slot on the interior wall of the pitcher where the ingredients for two types of beverages are visible from outside of the pitcher on the mixing ruler.

Now referring to FIGS. 6-8, there is illustrated another embodiment of the kit 12 formed by the combination of the releasably attached a mixing ruler 52 and pitcher 14, where the mixing ruler 52 identifies the ingredients for mixing four gin based cocktails. In FIG. 6, mixing ruler 52 is inserted in the slot 46 of pitcher 14 so that the ingredients for mixing a "WAKE-UP-CALL" cocktail or a "WHITE LADY" cocktail are visible from the outside of the pitcher so as to identify the measuring lines for the respective ingredients to be added. As shown in FIG. 6, the mixing ruler is mounted on the inside surface of the pitcher 14 so that the lower end 38 of the ruler 52 abuts the pitcher closed end portion 20. The ruler 52 extends the length or height of the pitcher to where the enlarged upper end of the ruler 52, identifying the base ingredient for the cocktail, is clearly seen. In this case, it is clearly identified that the mixing ruler 52 is used to prepare gin based cocktails.

On the surface 42 of the mixing ruler 52 the respective ingredients are identified by color code or as indicated in FIG. 6 by bold print and lighter print. To prepare a "WHITE LADY" gin cocktail, the ingredients are sequentially added to the pitcher 12. First, lime juice is added to the measuring line opposite lime juice, followed by the addition of simple syrup to the level of the measuring line therefor, followed by gin to the measuring line therefor. Correspondingly, to prepare a "WAKE-UP-CALL" gin cocktail, agave is added first in the bottom of the pitcher to the measuring line. Lemon juice is added thereafter to the measuring line therefor, followed by grapefruit juice to the measuring line followed by gin. Again, it is clearly seen that once the mixing ruler is securely positioned in the slot 46 on the wall 34 of the pitcher 14, the ingredients needed for the cocktail are clearly identified. The quantity to be added is simply determined by the level to which the ingredient is progressively added to overlie the measuring line 51 for the ingredient.

FIG. 7 illustrates the configuration of the mixing ruler 52 shown in FIG. 6. The mixing ruler has an elongated body portion 30 of a length that is determined by the dimensions of the pitcher in which the ruler is mounted. The body portion of the mixing ruler is relatively thin expanding slightly in width from the lower end 38 up to the point where it meets the upper end 40 of the ruler where the basic ingredient for the cocktail is identified. For the gin cocktail, the word "GIN" appears on each side of the upper end 40 of the mixing ruler 52.

On the side 44 of the mixing ruler 52 shown in FIG. 8 the ingredients for two different types of gin cocktails are identified. This example includes an "NEGRONI" gin cocktail and a "RASPBERRY COLLINS" gin cocktail. The ingredients of each cocktail are color coded. The NEGRONI gin cocktail is mixed by sequentially adding Campari, gin, and sweet vermouth into the pitcher 14 up to the respective measuring lines identified for each ingredient on the surface 44. The RASPBERRY COLLINS gin cocktail is identified by like printed ingredients beginning with lemon juice, followed by gin, followed by club soda, followed by raspberry syrup. Each of these ingredients is sequentially added one after another to the respective measuring line for each ingredient.

Figure 10:
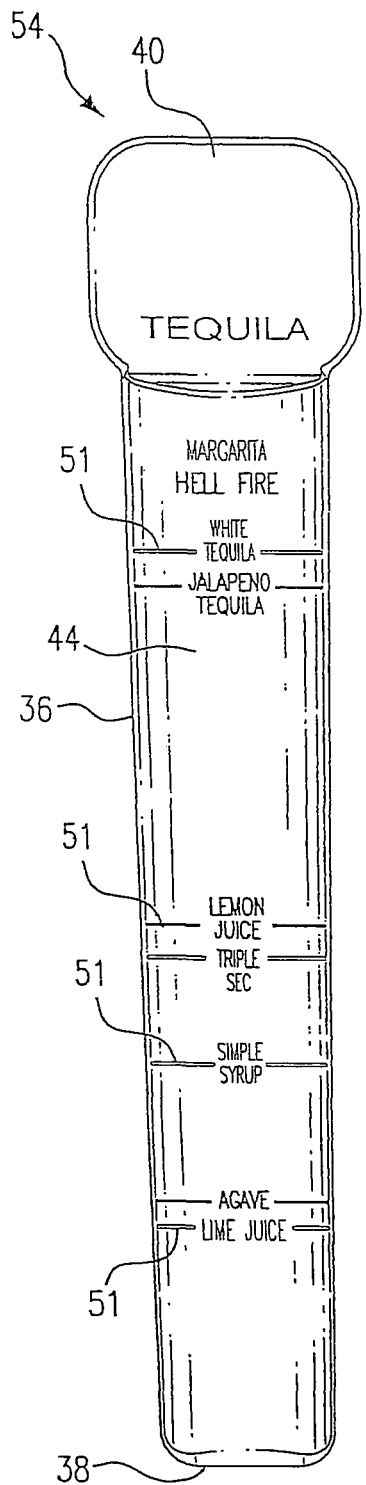
FIG. 10 is a view in side elevation of the opposite side of the mixing ruler shown in FIG. 9, illustrating the ingredients for mixing two additional tequila based beverages in the pitcher.

FIGS. 9 and 10 illustrate another embodiment of a mixing ruler 54 used to prepare a tequila based cocktail. On the opposite sides 42 and 44 are identified two different types of tequila based cocktails for a total of four cocktails identified on the mixing ruler 54. In the same manner in which the respective ingredients for each cocktail are distinguished from each other, two tequila cocktails identified for mixing on each of the surfaces 42 and 44.

A "LA PALOMA" tequila based cocktail identified on surface 42 of the mixing ruler 54 shown in FIG. 9 is prepared by first inserting the ruler 54 in the slot 46 on the inside wall 34 of the pitcher 14. Grapefruit is first added to the pitcher up to the measuring line 51 therefor. After the grapefruit juice is added, white tequila is added to the indicated measuring line 51, followed by the addition of lime juice to the measuring line therefor. Once all the ingredients are added, the mixing ruler 54 is removed from the slot 46 and used to mix the ingredients together.

With the ruler 54 in the slot 46 in the pitcher as shown in FIG. 9, the ingredients for a "STRAWBERRY RITA" cocktail are visible from outside the pitcher. The first ingredient identified on the ruler 54 to be added is lime juice, then Elderflower liqueur is added to the measuring line 51 therefor, followed by strawberry puree to the measuring line therefor and thereafter followed by the addition of white tequila for the measuring line 51 therefor. Again, the measuring ruler 54 is used to mix the contents which are dispensed from the pitcher.

FIG. 10 illustrates the opposite side of the mixing ruler 54 shown in FIG. 9. On the surface 44 of the ruler 54 shown in FIG. 10 is listed the ingredients for a "MARGARITA" and "HELL FIRE" tequila based cocktail. In the method as described above, once the mixing ruler 54 is positioned in the slot 46 of the pitcher 14 and the ingredients for two types of tequila based cocktails on the surface 44 are visible from the outside of the pitcher, the selected one of the cocktails is prepared. To prepare a "HELL FIRE" tequila based cocktail the first ingredient added to the bottom of the pitcher up to the measuring line 51 is agave. After agave, lemon juice is added to the volume to the point where it is positioned opposite the measuring line 51 for lemon juice. After the lemon juice is added, jalapeno tequila is added to the measuring line 51 therefor.

Alternatively, with the mixing ruler 54 shown in FIG. 10 positioned with the surface 44 visible from outside of the pitcher 14, a tequila based margarita is prepared by first adding lime juice sequentially followed by filling to the respective measuring lines, simple syrup, triple sec, and white tequila. Again, with the mixing ruler 4, by reversing the position of the ruler 54 in the slot 46 on the inside surface of the pitcher, four different types of tequila based beverages are prepared.

Figure 11:
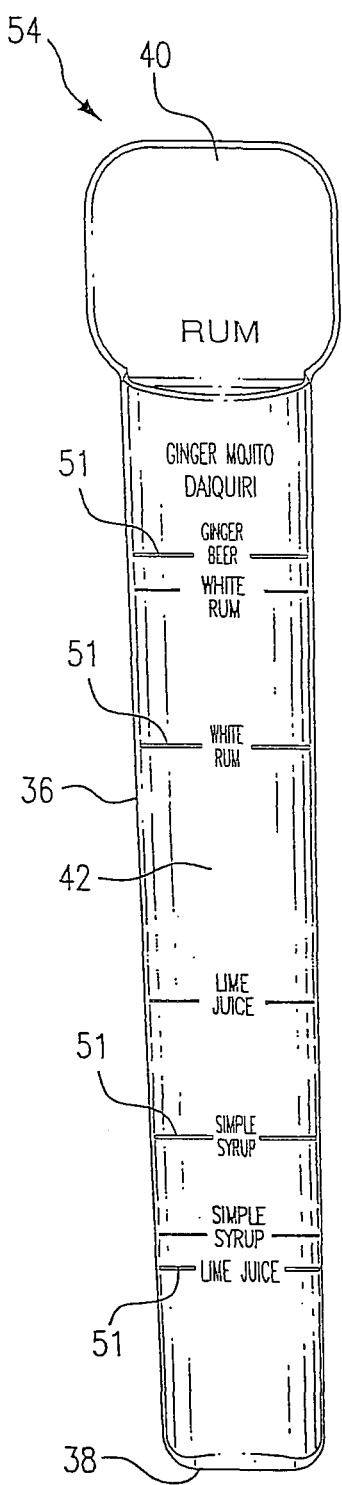
FIG. 11 is a view in side elevation of another embodiment of the mixing ruler, identifying the ingredients for mixing two types of rum based beverages.
Figure 12:
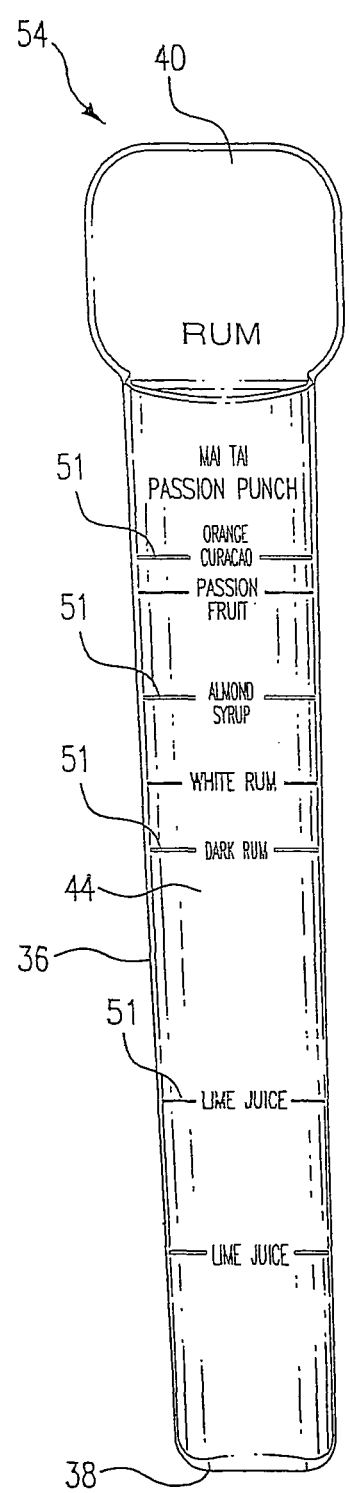
FIG. 12 is a view in side elevation of the opposite side of the mixing ruler shown in FIG. 11, illustrating the ingredients for mixing two additional rum based beverages in the pitcher.

FIGS. 11 and 12 illustrate the mixing ruler 56 that identifies four rum based cocktails. The ingredients for two different cocktails are positioned on the opposite surfaces 42 and 44 of the ruler 56. On the surface 42, shown in FIG. 11, one can choose to mix a "GINGER MOJITO" or a "DAIQUIRI". For a GINGER MOJITO, the first ingredient added to the pitcher 14 is lime juice, followed by simple syrup, followed by white rum, followed by ginger beer. Each ingredient is added sequentially to the pitcher after the prior ingredient up to the measuring line 51 identified for the ingredient added. Again, once all of the ingredients have been added, the mixing ruler 54 is removed from the slot 46 within the pitcher and used to stir the ingredients.

For a DAIQUIRI to be mixed in the pitcher 14, the first ingredient that is added to the pitcher is simple syrup, followed by lime juice, followed by white rum. Each ingredient is added sequentially one after the other. There is no guess work as to the volume of each ingredient that is added to the pitcher by virtue of simply adding the ingredient to a level in the pitcher 14 positioned opposite the measuring line 51 on the mixing ruler 56, as seen through the wall of the pitcher.

FIG. 12 illustrates the opposite surface 44 of the mixing ruler 56 for preparing "MAI TAI" and "PASSION PUNCH" rum based cocktails. With the mixing ruler 56 in the slot 46 with the surface 44 facing outwardly through the pitcher wall 34, a MAI TAI is prepared by first adding lime juice, followed by dark rum, followed by almond syrup, followed by orange curacao. Each ingredient is added sequentially to the pitcher in the volume determined by the measuring line 51 identifying the ingredient on the mixing ruler 56. The ingredients for PASSION PUNCH are identified as lime juice, white rum, and passion fruit. Each ingredient is added sequentially first beginning with the addition of lime juice.

The mixing ruler 56 shown in FIG. 12 is an example of two drinks having similar ingredients but added in different quantities. To distinguish between the quantity of lime juice that is needed to prepare a MAI TAI, as distinguished from the quantity of lime juice used to prepare Passion PUNCH, the required ingredients are color coded so that all the elements for each drink are readily identified and distinguished from the ingredients of the other cocktail.

Figure 13:
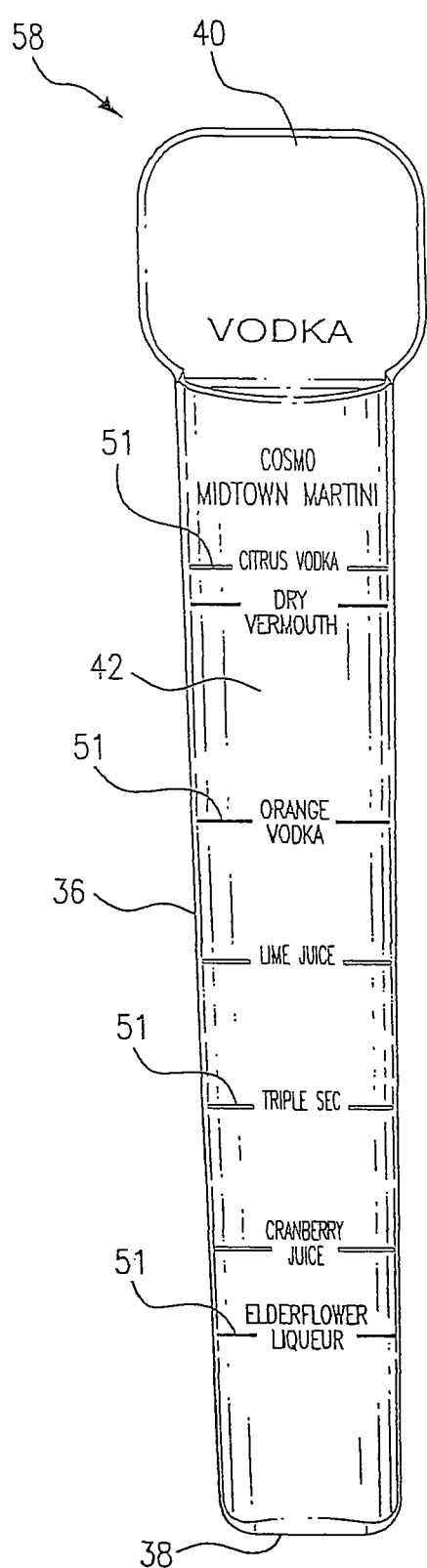
FIG. 13 is a view in side elevation of a further embodiment of the mixing ruler, illustrating the ingredients for mixing two types of vodka based beverages.
Figure 14:
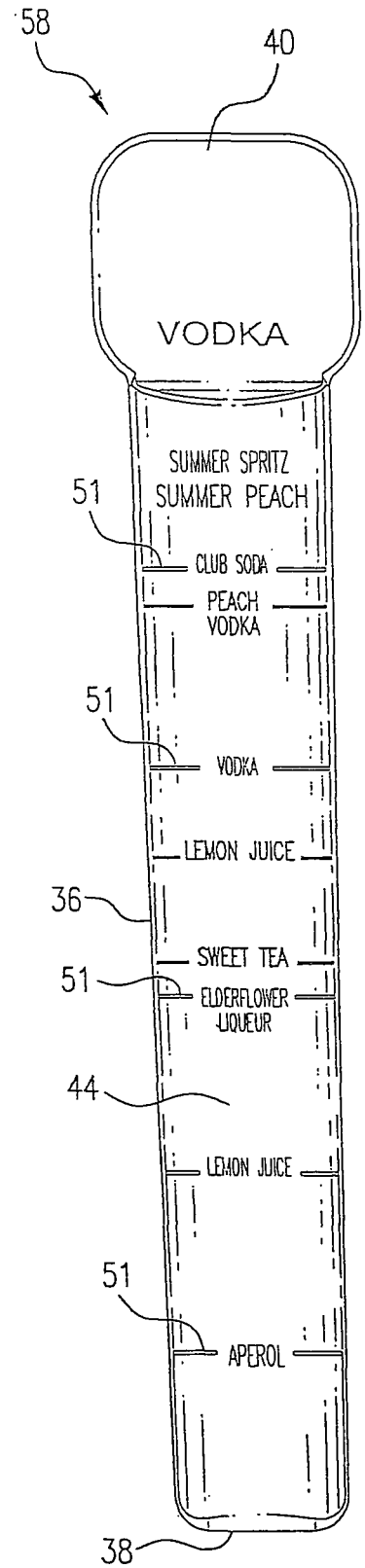
FIG. 14 is a view in side elevation of the opposite side of the mixing ruler shown in FIG. 13, illustrating the ingredients for mixing two additional vodka based beverages.

FIGS. 13 and 14 illustrate the embodiment of a mixing ruler 58 for preparing four different types of vodka based cocktails. On the surface 42 of the mixing ruler 58 shown in FIG. 13 either a "COSMO" or a "MIDTOWN MARTINI" is mixed and dispensed from the pitcher 14 using the coded identification of ingredients to distinguish between the two cocktails. The ingredients for a COSMO are identified as cranberry juice, triple sec, lime juice and citrus vodka. In the method as described above, once. the mixing ruler 58 is secured in position in the slot 46 on the inner wall 34 of the pitcher 16, the respective ingredients are added sequentially beginning with the first ingredient from the bottom of the pitcher up to the respective measuring line 51 for each ingredient until all of the ingredients for the selected beverage have been added to the pitcher. Once all of the ingredients have been added to the pitcher, the mixing ruler 58 is removed and used to stir the contents.

With the mixing ruler 58 shown in FIG. 13 used to prepare a "MIDTOWN MARTINI", the components of elderflower liqueur, orange vodka, and dry vermouth are sequentially added one after another to the levels of the identified measuring lines until all of the ingredients are added. In FIG. 14, the opposite surface 44 of the measuring ruler 58 identifies the ingredients for mixing a "SUMMER PEACH" or a "SUMMER SPRITZ" vodka based cocktail. The coded form of identifying the ingredients for each cocktail distinguishes the respective ingredients.

To prepare a SUMMER SPRITZ, the first ingredient added to the pitcher is Aperol, followed by lemon juice, followed by elderflower liqueur, vodka, and finally club soda to the measuring line therefor. As with the prior methods of mixing, each ingredient is added one after the other up to the level of the mixing line 51 that identifies the ingredient visible through the wall of the pitcher. The SUMMER PEACH vodka based cocktail includes the ingredients of sweet tea, lemon juice, and peach vodka, each added sequentially, one after the other.

Figure 15:
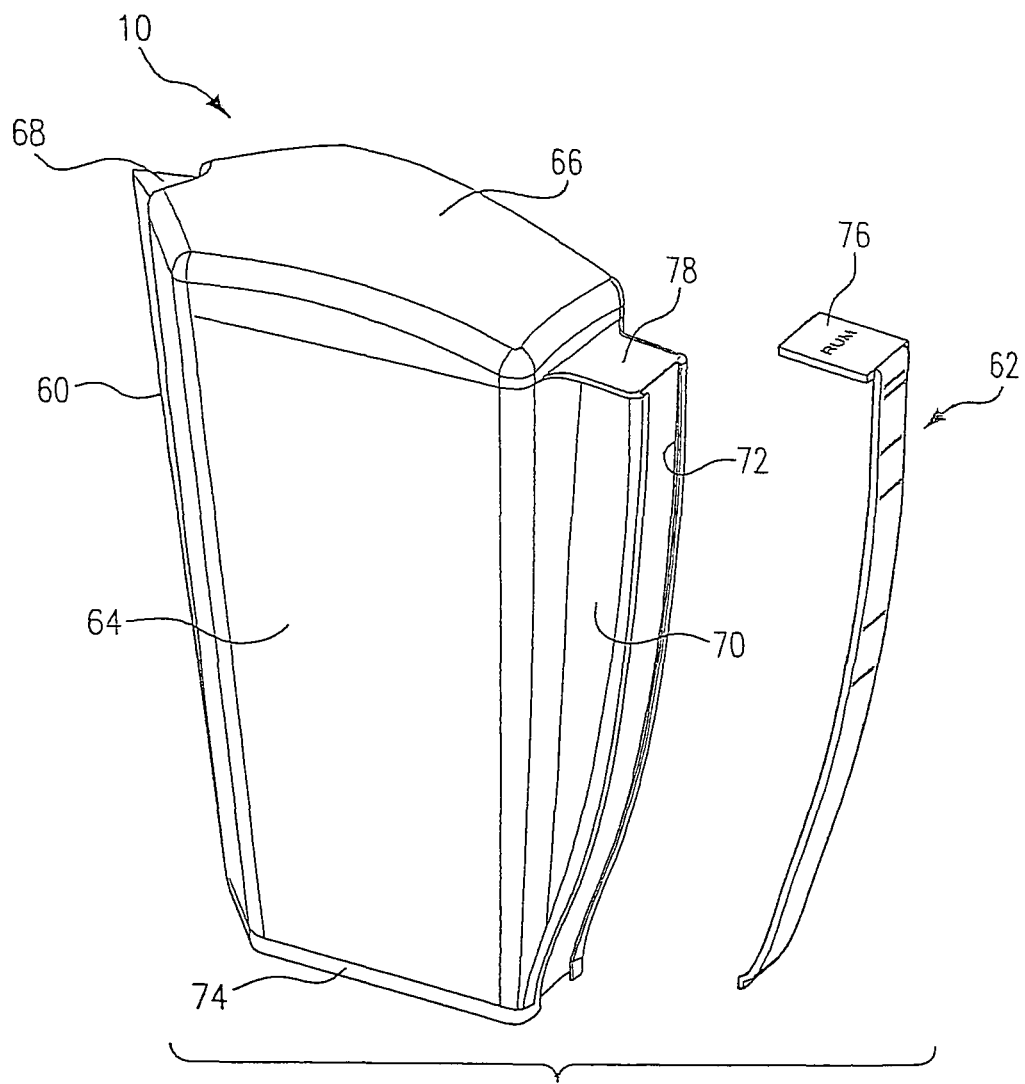
FIG. 15 is an exploded isometric view of another embodiment of the combination pitcher and mixing ruler, illustrating the mixing ruler releasably connected to the handle of the pitcher to identify the ingredients of a beverage for mixing.

Referring to FIG. 15, there is illustrated a further embodiment of a kit 12 for mixing and preparing beverages that includes a vessel 60 and a mixing ruler 62 detachably connected to the vessel 60. Preferably the vessel 48 is in the embodiment of a pitcher injected molded of plastic and having a transparent body portion 64 and a removable cover 66 that permits access to the interior of the pitcher for adding ingredients for the beverage to be mixed. The pitcher or vessel 60 includes at one end a pour spout 68 from which the mixed beverage is dispensed and on the opposite side an integral handle 70. The body portion 64 of the pitcher 60 together with the spout 68 and handle 70 are integrally formed, preferably by plastic injection molding.

Figure 16:
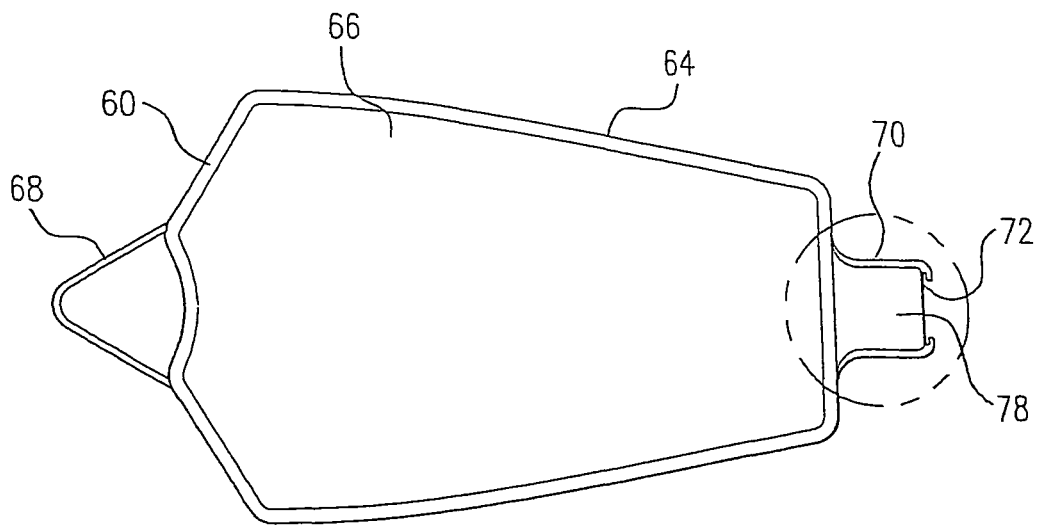
FIG. 16 is a top plan view of the embodiment of the pitcher shown in FIG. 15, illustrating the handle having a slot for a snap-on connection of the mixing ruler to the pitcher.

As seen in FIG. 16, the handle 70 projects from the pitcher body portion 64 to an outer end that is molded to form a groove 72 that extends longitudinally on the handle 70 substantially the length of the pitcher from lower end 74 to the cover 66. The mixing ruler 62 has a length and width that is snapped into position in the groove 72 where a horizontal tab 76, shown in FIG. 15, extending from the upper end of the ruler 62 overlies surface 78 of cover 66. As seen in FIG. 18, the groove 72 extends substantially the length or height of the pitcher 60. As seen in FIG. 19, the length of the mixing ruler 62 corresponds in length to the groove 72. When the mixing ruler 62 is snapped in place in the groove 72, the mixing ruler extends from the pitcher lower end 74 to the pitcher cover 66.

Further in accordance with the present invention as described above for the embodiments of the mixing rulers 52, 54, 56, and 58 illustrated in FIGS. 7-14, the mixing ruler 62 illustrated in FIG. 19 identifies the ingredients for mixing two different beverages. As illustrated in FIG. 17, the tab for the ruler 62 identifies the cocktail to be mixed, for example RUM. The types of rum based cocktails for mixing are identified on the ruler 62. As shown in FIG. 19, the choices for rum based drinks are either a GINGER MOJITO or a DAIQUIRI. Each drink is colored coded so the user knows what ingredients are to be added for the desired cocktail.

To mix a GINGER MOJITO in the pitcher 60 shown in FIG. 19, the cover 66 is removed. The first ingredient added to the pitcher is lime juice up to the measure line identified for lime juice in a GINGER MOJITO. Thereafter, simple syrup is added to the level in the pitcher identified by the measure line 51 for simple syrup. White rum is added to the pitcher to the measure line identifying white rum. The last ingredient to be added is ginger beer to the measure line therefor. Once all of the ingredients are added, the contents are mixed. With this embodiment, the mixing ruler 62 is not removed from its mounted position on the pitcher 60 because it is positioned outside of the pitcher. Any conventional stirring device is used to mix the contents. The same procedure is followed to mix the ingredients for a DAIQUIRI. First simple syrup is added followed by juice and finally the addition of white rum to the measuring line therefor.

With the embodiment illustrated in FIGS. 15-19, the mixing ruler 62 includes the description of ingredients for two drinks on only one side of the mixing ruler because the ruler snaps in place with the horizontal tab 76 engaging the surface 78 of the cover 66. The opposite side of the mixing ruler 62 is not used to identify the ingredients. Because the mixing ruler is removably attached to the pitcher 60, an entire set or library of mixing rulers 62 with tab 76 is available identifying the ingredients for any number of beverages.

It should be understood that while reference to mixing ingredients for forming beverages is one method of using the present invention, the kit 12 formed by the combination of the pitcher and mixing ruler, particularly for the embodiment shown in FIGS. 15-19, is not limited to mixing components of a beverage. The use of the mixing ruler 62 removably mounted on the exterior of the pitcher 60 can be used to prepare other combinations of ingredients that include primarily liquid ingredients that are not necessarily beverages.

The identification of the ingredients on the mixing ruler 62 is formed by any desired printing, stamping, molding or embossing method that substantially, permanently impresses the identification of the ingredients in the sequence to be added. Selected stamping, labeling and printing methods can be used to inscribe the ingredients. In one embodiment the identification of the ingredients is formed on a printed sheet of material that is adhered to the surface of the ruler 62. Also the print identifying the ingredients can be formed in the process of injection molding of the ruler and pitcher.

FIGS. 20-22 illustrate a further embodiment of a kit 12 that includes a vessel 80 in the embodiment of a pitcher and a mixing ruler 82 detachably connected to extend on the outer surface of the pitcher 80. In a conventional construction, the pitcher 80 includes a substantially cylindrical body portion 84, a closed end portion 86, and an upper open end portion or rim 88. A handle 90 extends from one side of the pitcher 80. A pour spout 92 extends from the upper open end portion 88.

The mixing ruler 82 has a length that extends substantially the height or length of the pitcher 80. The upper end of the ruler 82 includes a hook-like end portion generally designated by the numeral 94 having an upper planar surface 96 as shown in FIG. 22 that identifies the type of beverage to be prepared by mixing the ingredients shown on the ruler 82. The hook-like end portion 94 attaches the ruler 82 to the pitcher 80. A pair of tabs 98 and 100 extend inwardly from the upper surface 96 toward the body of the ruler 82 to form a reduced clearance area 102 between the end of each tab 98 and 100 and the body of ruler 82. The upper surface 96 of the ruler 82 rests on the rim 88 of the pitcher 80 which extends into the reduced clearance area 102 between the tab 98 and the wall of the pitcher. In this position, the end of the ruler 82 is frictionally engaged and hooked to the rim 88 of the pitcher. This secures the ruler 82 to extend in vertical alignment downwardly on the outside of the pitcher. In this manner the mixing ruler 82 is easily attached and detached from connection to the pitcher on the outside of the pitcher 82 where the ruler is clearly visible.

The mixing ruler 82 has opposite surfaces 104 and 106, as shown in FIG. 20, on which are listed the ingredients for two different beverages. As illustrated in FIG. 21, the surface 104 of ruler 82 is exposed on the outer surface of the pitcher 80 to display the ingredients for two types of whiskey based cocktails for mixing in the pitcher, "BOURBON & BERRIES" and "WHISKEY SMASH". As with the methods described above, the ingredients for each cocktail are color coded so as to make it easy to identify the ingredients needed to mix each cocktail. The identification of the ingredients are impressed or printed in any suitable manner on the opposed surfaces 104 and 106. For example, in one embodiment the ingredients are embossed on the plastic body of the ruler 82.

With the ruler 82 attached to the pitcher 80, as shown in FIG. 21, the user selects one of the two types of cocktails for mixing. With four possible beverages to be mixed, the user selects the one to be mixed. The mixing ruler 82 is then hung in position on the rim 88 of the pitcher 80 to reveal the ingredients for the selected beverage. The desired beverage is then mixed in the pitcher 80 with the ingredients in the preferred order and amount. There is no requirement that each ingredient be separately measured in the volume to which it is added to the pitcher. The amount of each ingredient added to the pitcher is determined by the relative spacing between the measure lines 51 on the ruler 82. Thus by releasably attaching the mixing ruler 82 to the pitcher 80, as above described, the correct volume of ingredients is mixed in the pitcher. This takes all of the guess work out of how to mix any number of beverages.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for mixing beverages in a vessel comprising the steps of:
   identifying on a measuring guide the ingredients of a beverage selected for mixing in an open-ended vessel,
   positioning marks spaced apart the length of the measuring guide corresponding to the beverage ingredients,
   releasably attaching the measuring guide for slidable movement into and out of a fixed position secured to the surface of the vessel extending upright on the vessel from the open end of the vessel to the bottom of the vessel,
   filling the vessel with one ingredient after another beginning with the first ingredient added to the bottom of the vessel up to the mark identifying the first ingredient, and
   thereafter, adding the remaining ingredients one after the other to a level in the vessel opposite the respective identifying mark for the ingredient until all of the ingredients are added to the vessel.

2. A method as set forth in claim 1 which includes,
   constructing the vessel of a transparent material,
   positioning the measuring guide inside the vessel,
   supporting the measuring guide to extend in a fixed position on the inside of the vessel, and
   viewing the marks on the measuring guide identifying the ingredients of a beverage for mixing in the vessel from outside the vessel.

3. A method as set forth in claim 2 which includes,
   providing opposed surfaces on the measuring guide,
   positioning on the opposed surfaces an identification of the order and the amount of the ingredients required to be added to the vessel for preparing a preselected beverage as identified on the opposed surfaces, and
   supporting the measuring guide on the inside of the vessel so that the ingredients of the beverage selected for mixing in the vessel are visible on the measuring guide from outside the vessel.

4. A method as set forth in claim 1 which includes,
   releasably attaching the measuring guide to the top of the vessel to extend downwardly on the outside of the vessel so that the marks on the measuring guide identifying the ingredients for mixing a selected beverage are visible on the outside of the vessel, and
   sequentially adding each ingredient to the vessel in an amount where the level in the vessel is aligned with the mark corresponding to each ingredient.

5. A method as set forth in claim 1 which includes,
   positioning a slot on the inside surface of the vessel extending longitudinally from the open end of the vessel to the bottom of the vessel,
   inserting the measuring guide into the slot to secure the measuring guide in a fixed position on the inside of the vessel, and
   viewing on the measuring guide the marks identifying the ingredients for adding to the vessel for mixing.

6. A method as set forth in claim 5 which includes, inscribing on opposite sides of the measuring guide the marks for identifying the ingredients for mixing a preselected beverage in the vessel, and spacing the marks a preselected distance apart in a vertical array on the measuring guide as determined by the proportion of each ingredient added to the vessel for mixing the preselected beverage.

7. A method as set forth in claim 6 which includes, selecting for mixing in the vessel one of the beverages identified on the opposite sides of the measuring guide, and positioning the measuring guide in the slot so that the ingredients for mixing the selected beverage are visible through the wall of the vessel from outside the vessel.

8. A method as set forth in claim 7 which includes, reversing the position of the measuring guide in the slot so that the ingredients for mixing a selected beverage identified on the opposite side of the measuring guide are visible through the wall of the vessel from outside the vessel.

9. A method as set forth in claim 1 which includes, inscribing on opposite surfaces of the measuring guide marks identifying the ingredients for mixing a number of beverages in the vessel, and differentiating the inscribed marks identifying the ingredients of each beverage one from another so that a single measuring guide is used to prepare a number of beverages for mixing in the vessel.

10. A method as set forth in claim 1 which includes, positioning a handle vertically on the outside of the vessel for holding the vessel, and releasably securing the measuring guide to extend vertically on the handle the length of the vessel for viewing the marks identifying the ingredients for mixing a preselected beverage in the vessel on the handle.

11. A method as set forth in claim 10 which includes, providing a kit comprising a plurality of measuring guides identifying the ingredients for mixing a number of different beverages in the vessel, and selecting from the kit one of the measuring guides for securing to the handle of the vessel for mixing the ingredients of a preselected beverage in the vessel.

\* \* \* \* \*